United States Patent
Sarcar et al.

(10) Patent No.: US 11,463,343 B2
(45) Date of Patent: Oct. 4, 2022

(54) SDWAN OVERLAY ROUTING SERVICE

(71) Applicant: HEWLETT PACKARD ENTERPRISE DEVELOPMENT LP, Houston, TX (US)

(72) Inventors: Arijit Sarcar, Santa Clara, CA (US); Laxminarayana Tumuluru, Santa Clara, CA (US); Dilip Gupta, Santa Clara, CA (US); Stephen Su, Santa Clara, CA (US); Harish Magganmane, Santa Clara, CA (US); Shijie Ma, Santa Clara, CA (US); Sivaram Dommeti, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 13 days.

(21) Appl. No.: 17/065,505

(22) Filed: Oct. 7, 2020

(65) Prior Publication Data

US 2022/0109620 A1   Apr. 7, 2022

(51) Int. Cl.
*H04L 45/02* (2022.01)
*H04L 45/64* (2022.01)
*H04L 67/1008* (2022.01)
*H04L 45/745* (2022.01)

(52) U.S. Cl.
CPC .............. *H04L 45/02* (2013.01); *H04L 45/04* (2013.01); *H04L 45/64* (2013.01); *H04L 45/745* (2013.01); *H04L 67/1008* (2013.01)

(58) Field of Classification Search
None
See application file for complete search history.

(56) References Cited

U.S. PATENT DOCUMENTS

| | | | |
|---|---|---|---|
| 10,110,500 B2 | 10/2018 | Kore et al. | |
| 10,454,714 B2 | 10/2019 | Mayya et al. | |
| 10,749,785 B1* | 8/2020 | Thangavel | H04L 43/0817 |
| 10,938,717 B1* | 3/2021 | Sundararajan | H04L 45/50 |
| 11,165,702 B1* | 11/2021 | Jain | H04L 47/20 |
| 2019/0245830 A1 | 8/2019 | Ratnasingham | |
| 2019/0334813 A1 | 10/2019 | Raj et al. | |
| 2020/0177629 A1* | 6/2020 | Hooda | H04L 47/125 |
| 2020/0296029 A1* | 9/2020 | Shenoy | H04L 41/12 |
| 2020/0389393 A1* | 12/2020 | Bosch | H04L 45/50 |
| 2020/0396150 A1* | 12/2020 | Dillon | H04W 28/0804 |
| 2021/0067403 A1* | 3/2021 | Srinivasa | H04L 41/0668 |
| 2021/0126860 A1* | 4/2021 | Ramaswamy | H04L 43/0852 |
| 2021/0226849 A1* | 7/2021 | Malhotra | H04L 41/145 |
| 2021/0243053 A1* | 8/2021 | Dunbar | H04L 45/64 |

(Continued)

OTHER PUBLICATIONS

Juniper Networks, Contrail Service Orchestration, (Research Paper), May 13, 2020, 125 pgs, Juniper Networks, Inc, Sunnyvale, CA, USA.

*Primary Examiner* — Phirin Sam
(74) *Attorney, Agent, or Firm* — Sheppard Mullin Richter & Hampton LLP

(57) ABSTRACT

Systems and methods of software-defined wide area network (SDWAN) device routing are provided using a cloud-based overlay routing service that utilizes, a cloud-BGP service (CBS), and a path computation module (PCM), and overlay agents (OAs) implemented on the tenant side. The Oas, CBS, and PCM may interact with each other, e.g., publish/update local states, route prefixes, etc. to create/maintain routing in the SDWAN.

20 Claims, 6 Drawing Sheets

(56) References Cited

U.S. PATENT DOCUMENTS

2021/0273869 A1* 9/2021 Tourrilhes ............ H04L 43/0894
2021/0281551 A1* 9/2021 Arisankala .......... H04L 63/0464
2021/0288881 A1* 9/2021 Zhang ................. H04L 12/4633
2021/0288903 A1* 9/2021 Gupta .................... H04L 49/70
2021/0344591 A1* 11/2021 Kondalam .............. H04L 45/02

* cited by examiner

SDWAN OVERLAY ROUTING SERVICE

DESCRIPTION OF RELATED ART

Software defined wide area networks (SDWANs) are network topologies that interconnect sites of a wide area network (WAN) using the principles of software defined networking (SDN), such as the separation of the control layer of traffic management from the data forwarding layer. SDWANs support infrastructure consolidation through network function virtualization (NFV). NFV reduces the administrative overhead and hardware cost of adding network functions to a WAN by virtualizing the network functions using virtual machines on more common and cheaper "commodity" hardware.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
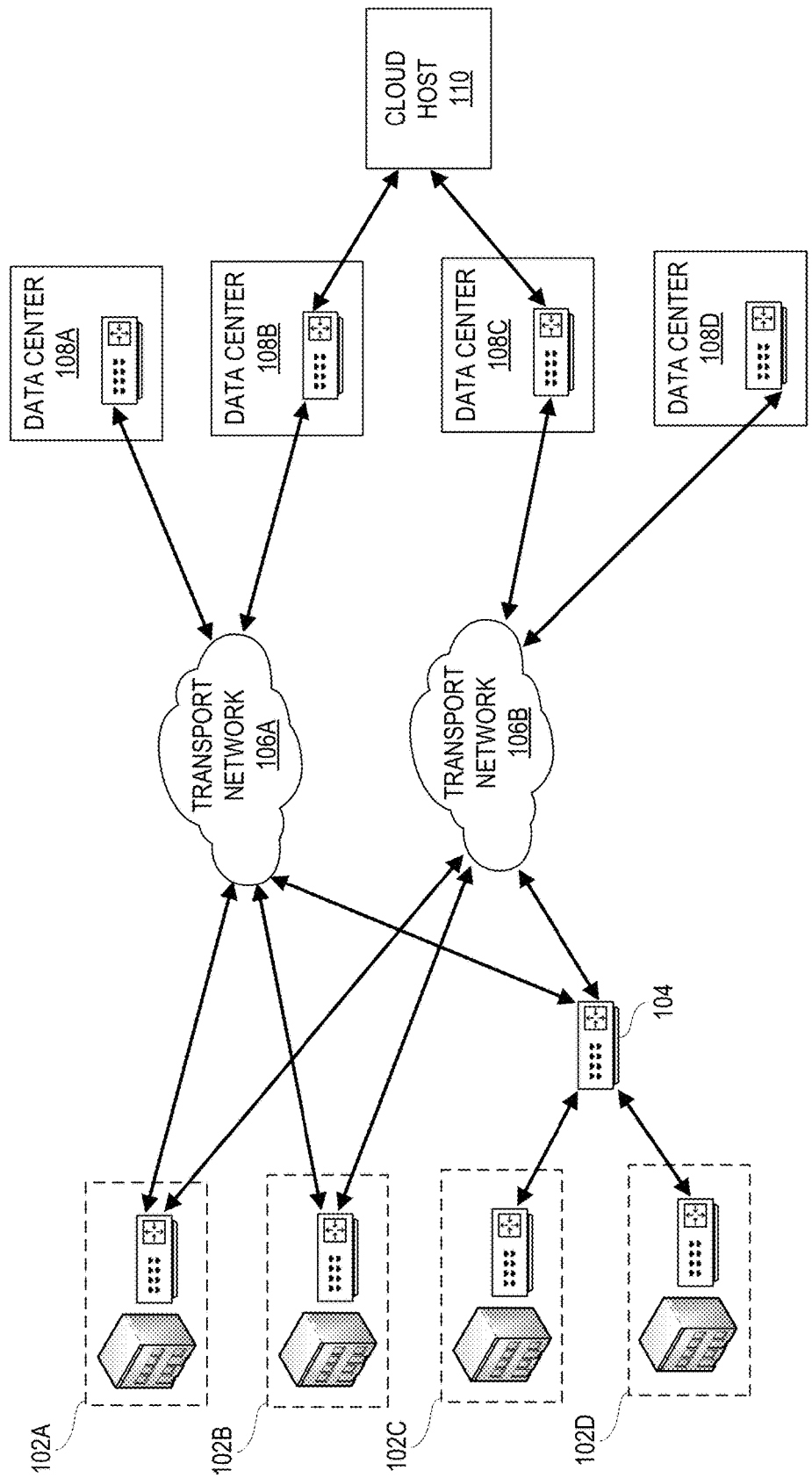
FIG. 1 illustrates an example SDWAN environment in accordance with embodiments of the technology disclosed herein.

The figures are not exhaustive and do not limit the present disclosure to the precise form disclosed.

DETAILED DESCRIPTION

A software defined wide area network (SDWAN) allows a network administrator to connect branch locations to a core site over a wide area network (WAN). The use of software defined networking (SDN) decouples network traffic decisions from the various devices within the network, such as routers, switches, bridges, and other common network devices. This decoupling essentially turns each networking device into a simple packet forwarding device. The SDWAN sets the potential traffic paths through each network device based on client policies (e.g., QoS requirements, bandwidth, etc.) to connect the branch locations within the SDWAN to the core site or data center, which is provided to each network device over a control channel. Instead of making a decision on how to route traffic when data is received, the network devices simply execute the route identified by the SDWAN administrator.

As alluded to above, the use of a SDWAN facilitates virtualization of network services across the WAN. Network function virtualization (NFV) reduces the administrative overhead and hardware cost of adding network functions to a WAN by virtualizing the network functions using virtual machines on more common and cheaper "commodity" hardware, rather than proprietary, dedicated hardware (as traditionally required). For example, functions like routing, load balancing, and firewalls may be operated as virtual machines (VMs) hosted at a data center and/or in the cloud. However, NFV focuses on virtualizing functions, but does not concern itself with how data packets are routed to the virtual machines running the network functions. SDWAN combined with NFV provides a more fully realized virtual network, where the SDWAN provides the routing policies for traffic flows from branch locations to the core site or data center hosting the NFV virtual machines. Branch users are capable of utilizing these resources through the SDWAN, reducing reliance on expensive proprietary hardware and reducing the amount of computing hardware required at branch sites of the WAN.

SDWANs may be implemented by creating a virtual overlay that is transport-agnostic and abstracts underlying private or public network connections. These network connections may include Multiprotocol Label Switching (MPLS), internet broadband, fiber, wireless or Long Term Evolution (LTE), to name a few. In some examples, virtual private network (VPN) tunnels are created between WAN sites to allow for private, secure interconnection across potentially vulnerable and insecure public links (e.g. Internet links). Clients may maintain existing WAN links and implement an overlay SDWAN using these tunnels to optimize bandwidth by directing WAN traffic to and from other WAN sites using identified routes that include these tunnels. Accordingly, SDWANs may be used to centralize network control across the entire WAN. Remote users, such as branch users, are capable of utilizing resources hosted at a data center and/or the cloud to run applications within the network.

Typically, SDWAN vendors rely on the border gateway protocol (BGP), a standardized exterior gateway protocol, to exchange routing and reachability information between systems to effectuate an SDWAN. However, with BGP, knowledge of the routes are federated, and multiple layers are needed to support large numbers of branches, and requires a tenant/customer to configure pairs of BGP instances. For example, in an SDWAN where the number of branches can be quite large, standard BGP mechanisms may not be sufficient or practical to use.

In an SDWAN architecture that embodies a single layer architecture, where each device/router may communicate directly with an orchestrator to achieve SDWAN, routing between branch gateways and virtual private network clients (VPNCs) may be performed. This routing can be implemented as a cloud-based overlay routing service. The cloud-based overlay routing service involving two main microservices, a cloud-BGP service (CBS), and a path computation module (PCM), along with an Etcd cluster (implemented in a cloud platform), and overlay agents (OAs) implemented on the tenant side.

Each OA can publish its locally learned and statically configured prefixes to the overlay routing service (a prefix or routing prefix can identify an address of a network, and routes can be determined/configured between prefixes), in particular to one of a plurality of CBS servers. CBS servers can send route updates to OAs that pass such route updates to an underlay routing stack at the tenant. OAs connect to CBS servers via an OA channel that is load balanced to a particular CBS server. OAs can perform re-synchronization to achieve a common state with the CBS servers/overlay routing service, after which the OAs will again publish learned routes (along with any relevant tunnel flaps), at which point, the CBS servers will publish these state updates to any PCMs in a given cluster. The publishing of these state updates will trigger new route calculations in each PCM, and thereafter, the PCMs will publish new updates to all CBS servers, which in turn, will distribute updates to any relevant OAs.

FIG. 1 illustrates an example SDWAN 100 in which embodiments of the technology disclosed herein are applicable. The example SDWAN 100 is simplified for ease of discussion, and a person of ordinary skill in the art would understand that the technology of the present disclosure is applicable to SDWANs with architectures of greater or lesser complexity. As illustrated in FIG. 1, the example SDWAN 100 includes a plurality of remote locations 102a, 102b, 102c, 102d, each with an SDWAN node device. An SDWAN node device is a networking device, such as a router, switch, modem, bridge, hub, or other common network device, which serves as a gateway to, or intermediate point within, the SDWAN. Remote locations 102a, 102b, 102c, 102d could be a branch office or other user located a distance from a network core site, such as a data center. In various embodiments, the core site is the entity which hosts virtualized network functions (VNFs) that may be shared by all of the remote locations 102a, 102b, 102c, 102d. In various embodiments, the SDWAN node device at the remote locations 102a, 102b, 102c, 102d is configured to act as an edge device for the remote location, providing an entry point to the SDWAN 100. The SDWAN node device at remote locations 102a, 102b, 102c, 102d may comprise a modem or other gateway networking device in various embodiments.

In various embodiments, the traffic between remote locations and the data centers may be routed through an intermediate SDWAN node device 104. Intermediate SDWAN node device 104 may be similar to the SDWAN node devices at remote locations 102a, 102b, 102c, 102d and data centers 108a, 108b, 108c, 108d. Intermediate SDWAN node device 104 may serve as the access point to the transport networks 106a, 106b of SDWAN 100 for a plurality of remote locations. Thus, SDWAN node device 104 may be thought of as a branch gateway, and SDWAN node devices at remote locations 102a, 102b, 102c, 102d as VPNCs. As illustrated in FIG. 1, remote locations 102c and 102d may be connected to intermediate SDWAN node device 104. Using one or more intermediate devices, like intermediate SDWAN node device 104, within the SDWAN enables the creation of different service regions, in some embodiments.

SDWAN 100 further includes one or more data centers 108a, 108b, 108c, 108d. Each data center 108a, 108b, 108c, 108d also has an SDWAN node device, similar to the SDWAN node device at remote locations 102a, 102b, 102c, 102d. In various embodiments, data centers 108a, 108b, 108c, 108d may host one or more applications which may be used by users at the remote locations 102a, 102b, 102c, 102d. In various embodiments, one or more data centers may be managed by the client that owns the SDWAN 100. In other embodiments, one or more data centers may be managed by a third party service provider.

Each transport network 106a, 106b may be associated with a set of data centers. As illustrated in FIG. 1, transport network 106a is associated with data centers 108a, 108b, while transport network 106b is associated with data centers 108c, 108d. In various embodiments, some applications may be hosted in cloud host 110, which may be accessed by one or more data centers associated with either transport network 106a or 106b. As illustrated in FIG. 1, data centers 108b and 108c provide access to at least one cloud application hosted in the cloud host 110.

Each remote location 102a, 102b, 102c, 102d is connected through the SDWAN node device to transport networks 106a, 106b. Transport networks 106a, 106b include different transport technologies, such as public Internet, multiprotocol label switching (MPLS), private Internet, asynchronous transfer mode, wireless WAN, broadband, satellite communications, or other network technologies. In various implementations, transport networks may be networks of various different service providers. As illustrated, the SDWAN 100 may include more than one transport network (transport networks 106a, 106b). SDWAN 100 may provide a method of defining a client network, overlaid on existing transport infrastructures of service providers for the physical routing of SDWAN traffic between different SDWAN node devices. Although only two transport networks 106a, 106b are shown in FIG. 1, various embodiments may include other quantities of transport networks, providing additional flexibility in how application traffic is routed from remote locations 102a, 102b, 102c, 102d to the associated data center 108a, 108b, 108c, 108d hosting the application. Data centers 108a, 108b, 108c, 108d include their own SDWAN node devices, providing access to the SDWAN 100 by servers and other components of the respective data center.

Within SDWAN 100, connectivity between remote locations with the data centers and/or cloud applications may be controlled via control software hosted by the SDWAN administrator. The client may develop policies focused on ensuring different traffic classes are routed within the network such that quality of service (QoS) and service level agreement (SLA) requirements are met. These policies are used to develop routing tables, which are distributed to the SDWAN node devices (like the SDWAN node devices described with respect to FIG. 1). The SDWAN node devices may identify the traffic from the different sessions streaming through the SDWAN node device and apply the routing rules embodied in the routing table for that category of traffic. To ensure that the requirements are met, clients may focus on traffic engineering principles, modifying the route certain traffic take through the transport networks to meet requirements. For example, a network administrator may set rules for a particular traffic class such that it is generally transmitted through the SDWAN node device of a branch office to an intermediate SDWAN node device (to apply DPI), and then over the public Internet transport network to a data center. However, in certain scenarios, the same traffic may be transmitted over an MPLS network. Accordingly, the SDWAN node devices and the data paths between branch offices and the data centers/cloud architecture may be determined before installation.

Figure 2:
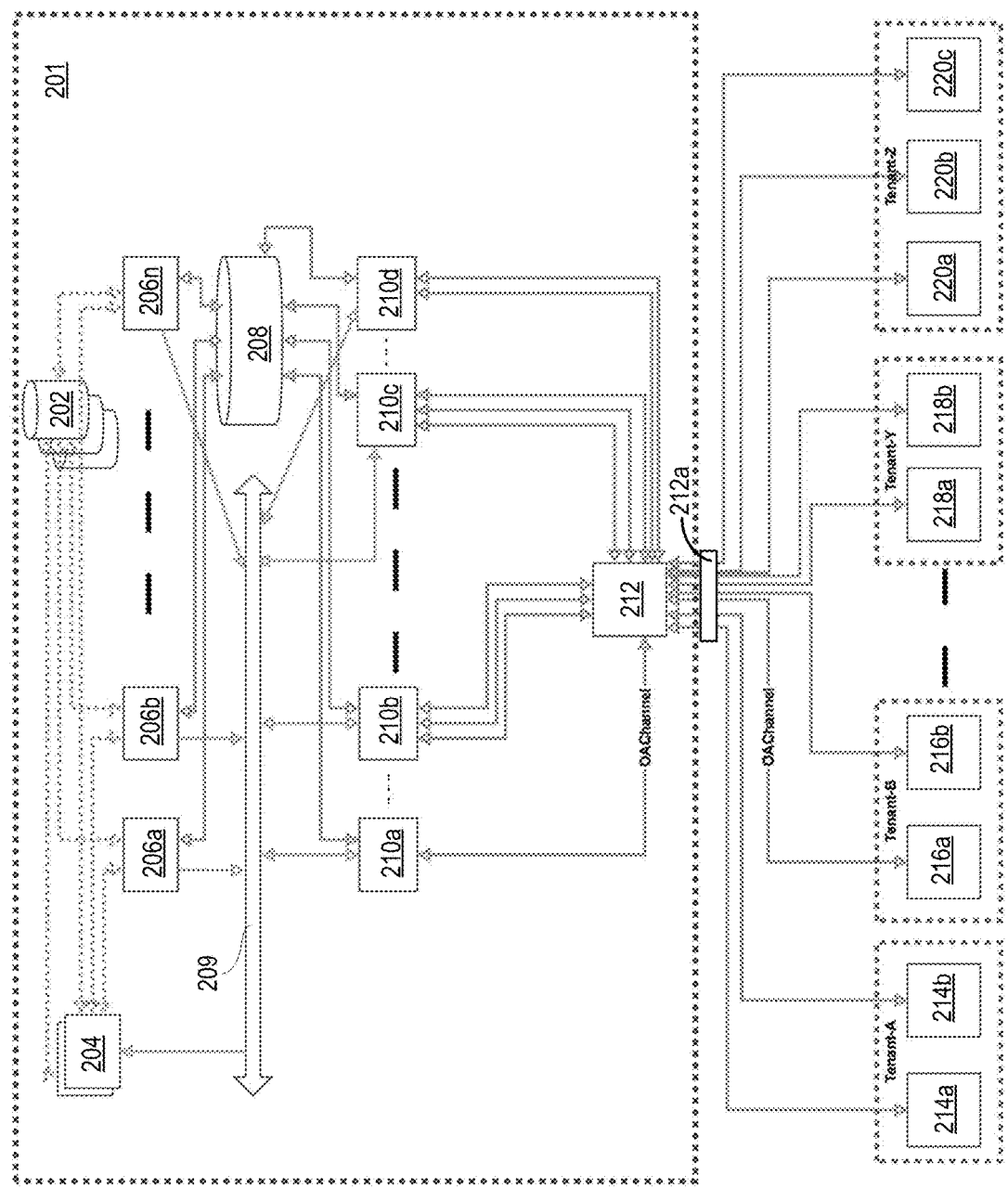
FIG. 2 illustrates an example system architecture of a SDWAN overlay routing service in accordance with embodiments of the technology disclosed herein.

FIG. 2 illustrates an example system architecture 200 for effectuating an SDWAN overlay routing service (SORS) 201 in accordance with one embodiment. As illustrated in FIG. 2, each tenant, e.g., tenants A-Z, may have respective branch gateways/VPNC overlay agents (OAs). For example, tenant A may have OAs 214a, 214b, tenant B may have OAs 216a, 216b . . . , tenant Y may have OAs 218a, 218b, and tenant Z may have OAs 220a-c. Each OA may be configured to connect to SORS 201 using an OA channel. Each OA, via its respective OA channel, can publish its locally learned and statically configured prefixes to SORS 201. Each OA channel may use an open source remote procedure call (RPC), such as gRPC, which uses HTTP/2 for transport purposes. This enables the creation of multiple, bidirectional streaming over the same TCP connection. Thus, each application, e.g., routing service, tunnel service, etc., may create its own stream. It should be noted that in order to isolate SORS 201 control plane traffic from other management traffic, a specific domain name system (DNS) domain name and corresponding virtual IP (VIP) address may be specified for SORS 201.

It should be understood that each OA can connect to an underlay routing daemon to obtain the statically configured prefixes (not shown). A CBS server, such as one of CBS servers 210*a-d* (described in greater detail below) may send route updates to its corresponding OA, which in turn will forward the route updates to the underlay routing daemon. In this way, the underlay routing daemon can configure the prefixes, which each OA will ultimately publish to SORS 201.

Each OA 214*a/b*, OA 216*a/b*, OA 218*a/b*, OA 220*a/b/c*, publishes the locally learned and statically configured prefixes to SORS 201 vis-à-vis an elastic load balancing (ELB) component 212*a*. ELB 212*a* performs Layer 4 load balancing. That is, ELB 212*a* can perform load balancing of host-to-host communication services for the OSI transport layer, and then may forward the OA channel data to an reverse-proxy/load-balancer cluster 212. That is, ELB 212*a* performs Layer 4 load balancing upon accepting OA channel data for distribution to the reverse-proxy/load balancing cluster 212 which effectuates HTTP termination and acts as an intermediary proxy service for passing the OA channel data into SORS 201. ELB 212*a* (or similar/equivalent function) may be implemented as an entry point into the cloud. An Nginx/envoy cluster 212 can terminate each OA channel (which is secure), and can establish a plain-text OA channel to one of the CBS servers, e.g., CBS servers 210*a-d*. In some embodiments, custom headers of data packets transmitted on the OA channels can be used as a basis for selecting a particular CBS server to which an OA channel is routed. In some embodiments, an OA, e.g., OA 214*a*, may insert such custom headers to indicate a tenant identifier and or other relevant fields.

Each of CBS servers 210*a*-210*d* may host the OA channel(s) routed thereto. Each of CBS servers 210*a*-210*d* can be responsible for distributing the routes generated by the PCM to all interested OAs of a tenant anchored to the particular CBS server (or set of CBS servers). It should be noted that all OAs of a branch gateway/VPNC belonging to the same tenant can be anchored to a particular CBS server or set of CBS servers. This can be done in some embodiments to optimize memory usage on CBS servers, where without such memory optimization, all CBS servers in SORS 201 would have to cache all the states/prefixes of all the tenants connected to each of the CBS servers.

In the "reverse direction," and as noted above, each of the CBS servers 210*a*-210*d* can be used to publish the prefixes and any routing updates received from an OA (e.g., one or more of OAs 214*a/b*, 216*a/b*, 218*a/b*, 220 *a-c*) to each PCM. In the event of a CBS server failure, Nginx/envoy cluster 212 will forward OA channel connections to active CBS servers, and branch gateways/VPNCs can re-synchronize their respective states with an active CBS. The active CBS can update redis cluster 208 and send a corresponding notification through message broker 209 and redis cluster 208 (described below), In some embodiments, a combination of monitoring scripts and periodic data comparison can be performed by a redis cluster 208 of redis instances, where redis keys are shared across multiple redis instances making up redis cluster 208. Redis cluster 208 may have slave nodes for resiliency/redundancy purposes. The data compared may be route state and tunnel status data. It should be understood that redis can refer to an in-memory data structure store that can be used as a database, cache, and message broker. Data loss in a redis cluster such as redis cluster 208 can occur due to a redis node failing, or a redis node being rebooted, for example. Upon an occurrence of either a failure or reboot, data reflecting the latest state of the OAs can be repopulated in redis cluster 208 by CBS servers 210*a*-210*d*. CBS server 210*a*-210*d* may then notify each PCM 206*a, b* . . . n and PCM scheduler 204 (described in greater detail below) to recompute routes between branch gateways and VPNCs for each of its associated tenant(s).

PCM scheduler 204 (which can comprise a plurality of PCM scheduler instances) can be used to handle tenant assignment, e.g., map PCMs, e.g., PCMs 206*a-n* to tenants, e.g., tenants A-Z. It should be understood that tenant assignment may be dynamic, and PCMs 206*a*-can be configured to operate on some set of tenants on-demand. Moreover, all PCMs can be configured to act as slaves to the PCM scheduler instances 204.

In operation, branch gateways/VPNCs in which OAs (e.g., OAs 214*a/b*, 216*a/b*, 218*a/b*, 220*a-c*) are implemented may connect to CBS servers 210*a-d* via respective OA channels as discussed above. In turn, the state of the branch gateways/VPNCs (i.e., route(s) and link status) published by the respective OAs are pushed to redis cluster 208 by the appropriate CBS server 210*a*-210*d*. Additionally, each CBS server 210*a*-210*d* may put notifications indicative of the new branch gateways/VPNCs state onto a message broker 209, such as a Kafka or RabbitMQ message broker, as well as onto the redis cluster 208. It should be understood that redis cluster 208 and message broker 209 may co-exist in the event state notifications may not scale to required high-write throughput conditions. This allows PCM scheduler 204 to pick up any notifications from message broker 209, and if a tenant is not yet assigned to a PCM, PCM scheduler 204 can map that as-of-yet unassigned tenant to an appropriate PCM, e.g., one of PCMs 206*a-d*. For PCMs that have already been assigned/mapped to a tenant(s), such PCMs may simply listen for updates on tenant-specific redis queues via the redis nodes comprising redis cluster 208.

It should be noted that each of CBS servers 210*a-d* may act as a helper for pre-sorting state notifications on a per-tenant basis. Moreover, PCMs that are assigned tenants can continue to pull state notifications from the aforementioned redis queues. Accordingly, these PCMs are not necessarily gated by PCM scheduler 204. PCM scheduler 204 may consider one or more of the following factors for scheduling purposes: the number PCMs that are alive/active; the number of devices, e.g., SDWAN nodes, associated with each tenant; the number of tunnels allocated to a tenant; as well as the latest state/configuration update for a tenant. The number of alive PCMS, tenant devices, and tenant tunnels can be used for load balancing purposes when mapping or assigning tenants to PCMs. The latest state/configuration update associated with a tenant can be used to disassociate or de-map a least recently used tenant from a PCM. Further still, PCM scheduler 204 can store tenant-to-PCM mapping information, as well as tenant-relevant information, e.g., the number of devices and tunnels associated with a tenant in a distributed key-value (KV) store 202, such as etcd. Storage of such information can be used to recover PCM scheduler 204 in the event of a failure or reboot.

In some embodiments, PCM scheduler 204 can discover all PCMs of SORS 201 using distributed KV store 202. As noted above, distributed KV store 202 can be used to store PCM-tenant mapping information, and PCM scheduler 204 can discover PCMs using tenant identification information to find a corresponding PCM. It should be noted that distributed KV store can also be used to provide distributed locking, monitoring via pub/sub real-time event messaging, service discovery, as well as leadership election.

Regarding leadership election, and as alluded to above, PCM scheduler 204 can be made up of a plurality of PCM scheduler instances. In some embodiments, one PCM instance can be elected to be a master PCM scheduler, while the remaining PCM scheduler instances can be configured as backup PCM schedulers. Thus, in the event a master PCM scheduler goes down or fails, the distributed KV store 202 can be used for election of a new master PCM scheduler from one of the backup PCM schedulers. A newly elected master PCM scheduler can load a current PCM scheduler state from the distributed KV store 202 (recalling that distributed KV store 202 can be used to store/backup tenant-to-PCM mapping and tenant-relevant information on behalf of PCM scheduler 204). In some embodiments, a new master PCM scheduler can obtain the latest tenant-PCM assignments for each PCM, and can reconcile those assignments based on what is stored in distributed KV store 202.

Returning to PCM discovery, each PCM 204a-d can register itself with the distributed KV store 202 whenever the PCM comes up, and each PCM 204a-d can unregister itself prior to going down. PCM scheduler 204 can initiate a client gRPC connection to each discovered PCM, and can periodically run PCM health checks. The following is a non-limiting list of RPCs that can be requested by PCM scheduler 204: "keep-alive/health-check" RPC; "load tenant" RPC (which refers to loading a tenant's current state from redis cluster 208 and performing a full route recompute); "unload tenant" RPC (which refers to relinquishing tenant ownership by a PCM and flushing any/all state updates performed on the tenant and captured in redis cluster 208); "full compute" RPC (for performing a full tenant route recompute (when data loss, described above, is detected and/or when a notification queue is full, and no updates can be picked up); "get current" RPC (for reconciling tenant assignments between PCM scheduler 204 and any one or more PCMs 206a-n); "clear tenant" RPC (which can be performed to clear/invalidate a tenant's data, but the tenant's current state is not flushed to redis cluster 208); and "clear all tenants" RPC (which can be performed, similar to the clear tenant RPC, but for all rather than an individual tenant, to clear the state of a PCM when health is restored to the PCM).

Each PCM, e.g., PCMs 206a-206n, as alluded to above creates routes between SDWAN nodes (based on the underlay routing daemon and by way of the OAs), which can then be published to all CBS servers in a cluster of PCMs. It should be understood that because PCM is a cloud microservice, depending on the number of customers/tenants, routes, tunnels, etc., the number of PCM nodes in a PCM cluster can increase/decrease commensurately. It should be understood that a PCM cluster may be configured to serve multiple different tenants (determined through a provisioning process described below), but a tenant will be served by only a single PCM cluster to avoid issues with synchronizing tenant-PCM mapping. In some embodiments, during provisioning, a set of tenants will be hard bound to a PCM cluster having the requisite number of PCM nodes, and the binding can be based on the number of tenant prefixes (routes), the number of tenant devices, etc.

If a PCM fails or crashes for some reason, PCM scheduler 204 (based on keep-alive/health check RPCs requested by PCM scheduler 204, will eventually become aware of the failure/crash. PCM scheduler 204 can reassign any tenants mapped to the downed PCM to another PCM. If PCM scheduler 204 is unable to connect to a particular PCM, e.g., due to some network partitioning, PCM scheduler 204 can reassign tenants mapped to that unreachable PCM after some time period/timeout duration. A PCM may also detect that it is no longer connected to PCM scheduler 204, and after some time period/timeout duration (that can be the same or different from that of PCM scheduler 204), the PCM can quarantine itself by not acting on any notifications from its associated CBS server. In this way, it can be ensured that two or more different PCMs are not acting on the same tenant at the same time. It should be understood that FIG. 2 is an example architecture, and the number of components, manner of connection/interaction between those components, etc. can differ in accordance with other embodiments.

Figure 3A:
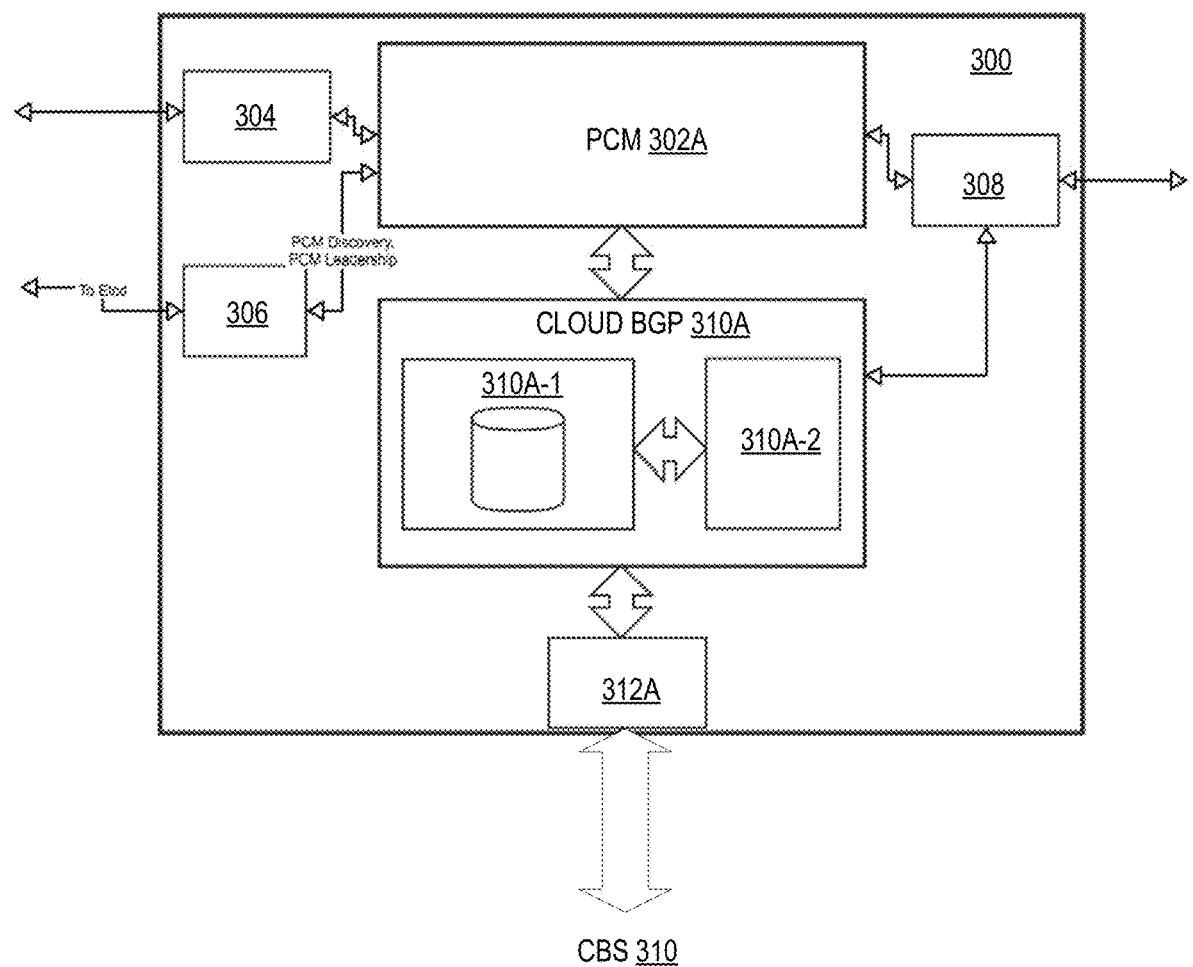
FIG. 3A illustrates a schematic representation of an example path computation module service in accordance with embodiments of the technology disclosed herein.

FIG. 3A illustrates a schematic representation of a PCM service instance in accordance with one embodiment. As illustrated in FIG. 3A, PCM service instance 300 may comprise a PCM 302A, which may be an embodiment of a PCM, such as PCM 206a (described above with reference to FIG. 2). As described above, PCM 302A may compute or create routes within a SDWAN based on prefixes/states received from an underlay routing daemon and published by a tenant device (branch gateway or VPNC) OA via an OA channel. Accordingly, PCM service instance 300 can include a configuration/tunnel interface 304. For debugging purposes, PCM 302 may include a REST server with monitoring/debugging APIs 308 to expose internal states of various elements/components. Such APIs 308 can be queried to obtain this internal state information.

PCM 302A can publish (after any requisite synchronization/re-synchronization) to an OA. Communication via an OA channel can be effectuated through a CBS server, where each OA channel may use an RPC, such as gRPC 312A, for transport purposes. FIG. 3A illustrates a cloud BGP instance 310A hosted or executed on such a CBS server. Typically, as discussed above, implementation of a SDWAN is effectuated using BGP, but standard BGP may not be practical, and may not allow for the requisite scaling contemplated in accordance with various embodiments. That is, a SORS implementation is contemplated as being scalable to serve multiple customers/tenants with tens of thousands of devices/gateways, such as branch gateways and VPNCs. Accordingly, the CBS should have the capacity/capability of supporting a large number of such devices. To provide the requisite capability to the CBS of SORS implementation, the CBS is configured to be horizontally scalable to serve multiple OAs. Additionally, the CBS can be a pseudo-stateless service, and can therefore serve multiple tenants at the same time without any hard-binding. That is, any CBS server/instance can service any device belonging to any tenant. It should noted, as described above, that in contrast, tenants may be hard-bound to a particular PCM cluster, e.g., only one PCM instance can service a request from any device belonging to a tenant.

In some embodiments, the CBS may implement BGP route-reflector functionality, wherein instead of requiring each BGP system to peer with every other BGP system, peering occurs between BGP system and a route reflector. Routing advertisements can then be sent to the route reflector which can be reflected out to other BGP systems. Accordingly, cloud BGP instance 310A may include a KV pub/sub function 310A-1 to allow for state synchronization with OAs and route pub/sub and a peer/message handler 310A-2 (which can be extended to support other payload types, e.g., tunnel operational status, and traffic engineering routes). It should be understood that a CBS can maintain states (hence not fully stateless/pseudo stateless as noted above) for device updates it may have received, but is stateless in terms of the devices it can serve, i.e., the CBS has no tenant affinity. As described above, a distributed KV store can be used to support the route monitoring (pub-sub) commensurate with KV pub/sub function 310A-1, as well as support PCM leadership functionality, e.g., master PCM scheduler election and PCM discovery. Accordingly, PCM service instance 300 may include a distributed KV store adapter 306.

It should be noted that use of the conventional BGP routing stack as a route reflector is not possible (hence use of cloud BGP disclosed herein), not only due to inability to scale, but because conventional BGP utilizes TCP for transport making it difficult to load-balance connections coming from different tenants into a tenant-specific PCM service. As noted above, load balancing (based on the identity of a tenant (tenant-id) can be performed, where all traffic belonging to a particular tenant is sent to its corresponding/assigned PCM.

Figure 3B:
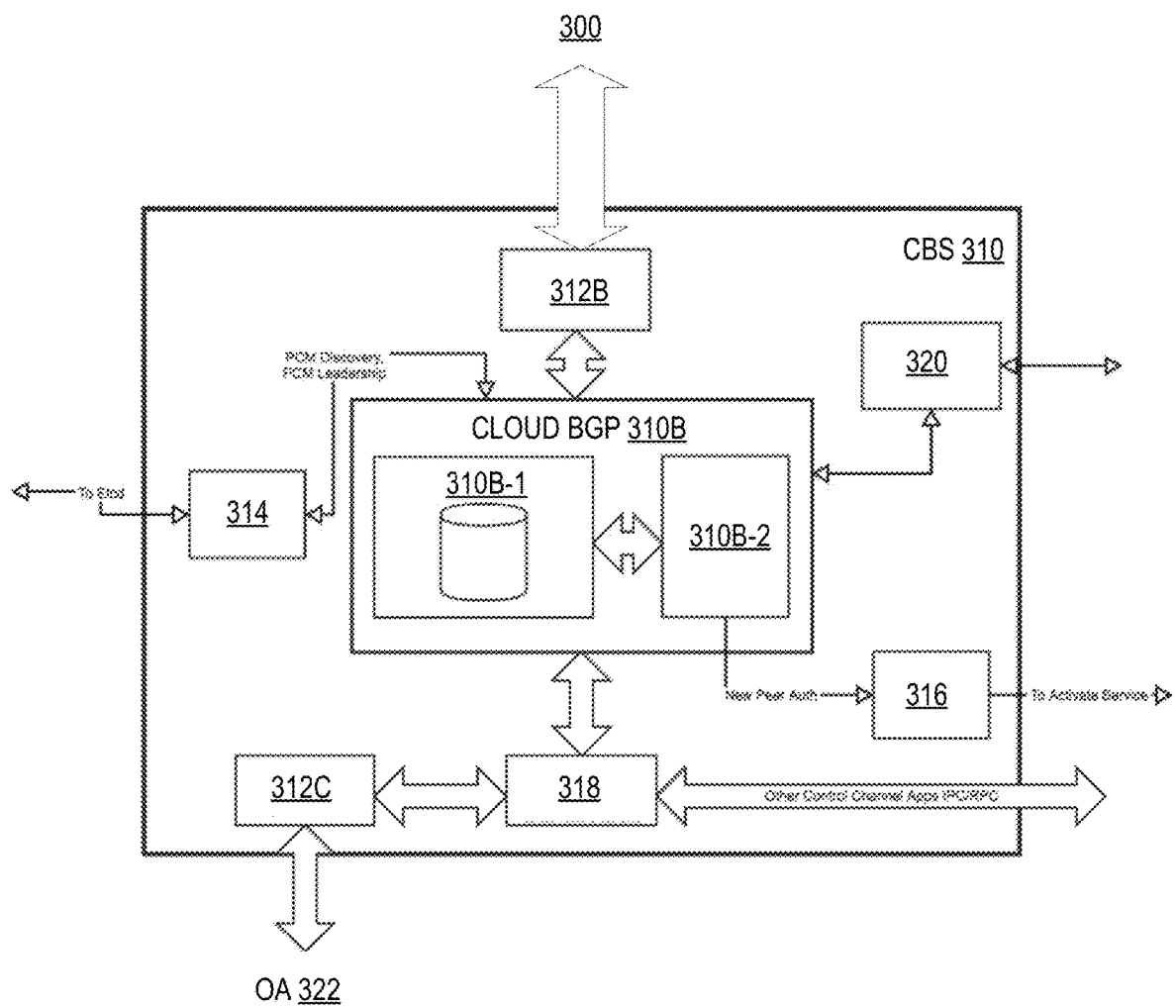
FIG. 3B illustrates a schematic representation of an example cloud branch gateway protocol service in accordance with embodiments of the technology disclosed herein.

FIG. 3B illustrates a schematic representation of a CBS instance 310 in accordance with one embodiment. The components/functionality of CBS instance 310 are similar/correspond to those described above regarding PCM service instance 300. That is, CBS instance 310 may include an RPC, such as gRPC 312B, for transport purposes to facilitate communications between PCM service instance 300 and CBS instance 300 and gRPC 312C to facilitate communications with OAs of a tenant, e.g., an OA 322. Like PCM service instance 300, CBS instance 310 may comprise a cloud BGP instance 310B. Cloud BGP instance 310B may include a KV pub/sub function 310B-1 to allow for state synchronization with OAs and route pub/sub and a peer/message handler 310B-2 (which can be extended to support other payload types, e.g., tunnel operational status, and traffic engineering routes). As described above, PCM leadership functionality, e.g., master PCM scheduler election and PCM discovery can be supported via a distributed KV store. Accordingly, CBS instance 310 may include a distributed KV store adapter 314.

As noted above, cloud BGP can use route reflectors for peering, and thus, CBS instance 300 may include an authentication component 316 for new peer authentication and to activate service between devices. Also like PCM service instance 300, CBS instance 310 may a monitoring/debugging API(s) 320 that can be called by a user via a REST server (not shown). Moreover, CBS instance 310 may include a control channel multiplexer/demultiplexer 318 for handling other control channel application calls/communications, e.g., interprocess communications (IPCs) and RPCs.

Figure 4:
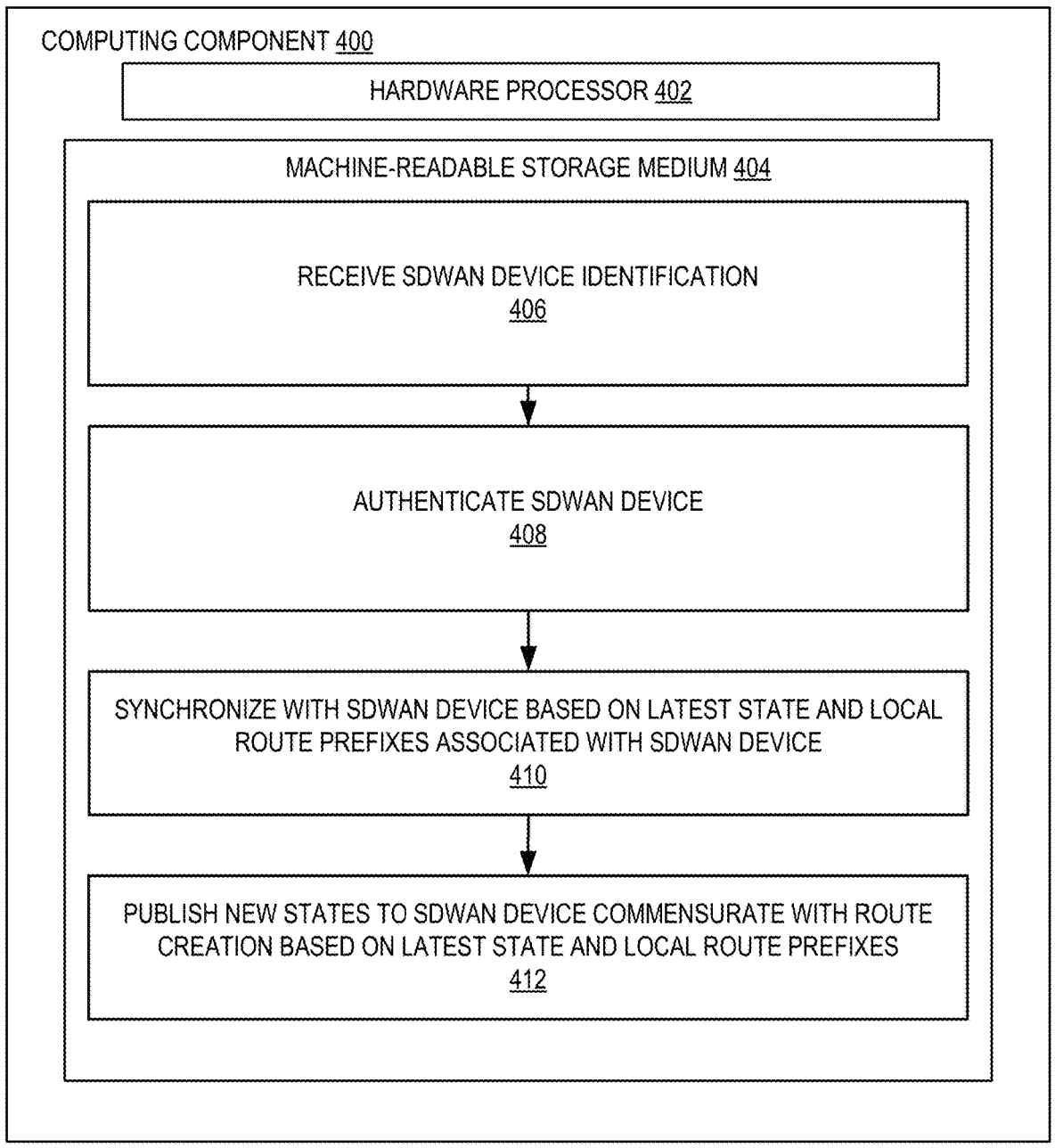
FIG. 4 illustrates an example method in accordance with various embodiments of the technology disclosed herein.

FIG. 4 is a block diagram of an example computing component or device 400 for performing service assurance functions in accordance with one embodiment. Computing component 400 may be, for example, a server computer, a controller, or any other similar computing component capable of processing data, and realizing the functionality of an assurance engine. In the example implementation of FIG. 4, computing component 400 includes a hardware processor 402, and machine-readable storage medium 404. In some embodiments, computing component 400 may be an embodiment of a processor.

Hardware processor 402 may be one or more central processing units (CPUs), semiconductor-based microprocessors, and/or other hardware devices suitable for retrieval and execution of instructions stored in machine-readable storage medium, 404. Hardware processor 402 may fetch, decode, and execute instructions, such as instructions 406-412, to control processes or operations for establishing connections, synchronizing, and publishing routes/states. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 404-412.

Hardware processor 402 may implement functionality of one or more components/elements of a SORS, such as SORS 201 (FIG. 2), and may execute instruction 406 to receive a SDWAN device identification. That is, the CBS (implemented across one or more CBS servers in a SORS) and PCM service (implemented across one or more PCM servers in a SORS) may come up/initialize operation. The OAs of tenant SDWAN devices, e.g., branch gateways and VPNCs, may also initialize operation, at which point the OAs will connect to the SORS using the specific DNS/VIP of the SORS using corresponding OA channels. Again, a specific DNS/VIP is used to isolate control plane traffic from other management traffic. At this point, the OAs can identify themselves to the SORS. OA identification information can include device serial number, tenant identifier, authentication token, etc.

Hardware processor 402 may execute instruction 408 to authenticate the SDWAN device. In particular, the CBS of the SORS will authenticate the OA by matching the OA identification information received from the OA with identification information maintained in an authentication server or database. As described above with respect to FIG. 3B, authentication can be performed by the CBS using authentication component 316. As described above, in some embodiments, the OA can insert custom HTTP headers to identify the tenant of the OA. It should be noted that if authentication fails, the connection between the OA and CBS can be reset.

Hardware processor 402 may execute instruction 410 to synchronize with the SDWAN device based on the latest route state and local route prefixes associated with the SDWAN device. That is, the OA and CBS can synchronize/resynchronize route information, and the OA can upload all required route states and tenant prefix associated with the OA. It should be understood that local routes/route prefixes can be learned via the underlay routing stack, which the OA can push to the PCM via the CBS over an OA channel. In some embodiments, the CBS can mark all existing routes created by the PCM as being stale, and can wait for route updates from a new PCM master in the event of a PCM failure. If any routes do not end up being updated, the CBS can mark those routes as being deleted routes, and again, the OAs can be synchronized with the PCM.

In turn, the PCM can process these latest route states/prefixes (i.e., updated route/path information) and create new routes/paths. That is, hardware processor 402 may execute instruction 412 to publish the new states to the SDWAN device commensurate with the newly created routes/paths based on the latest route states/prefixes.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 5:
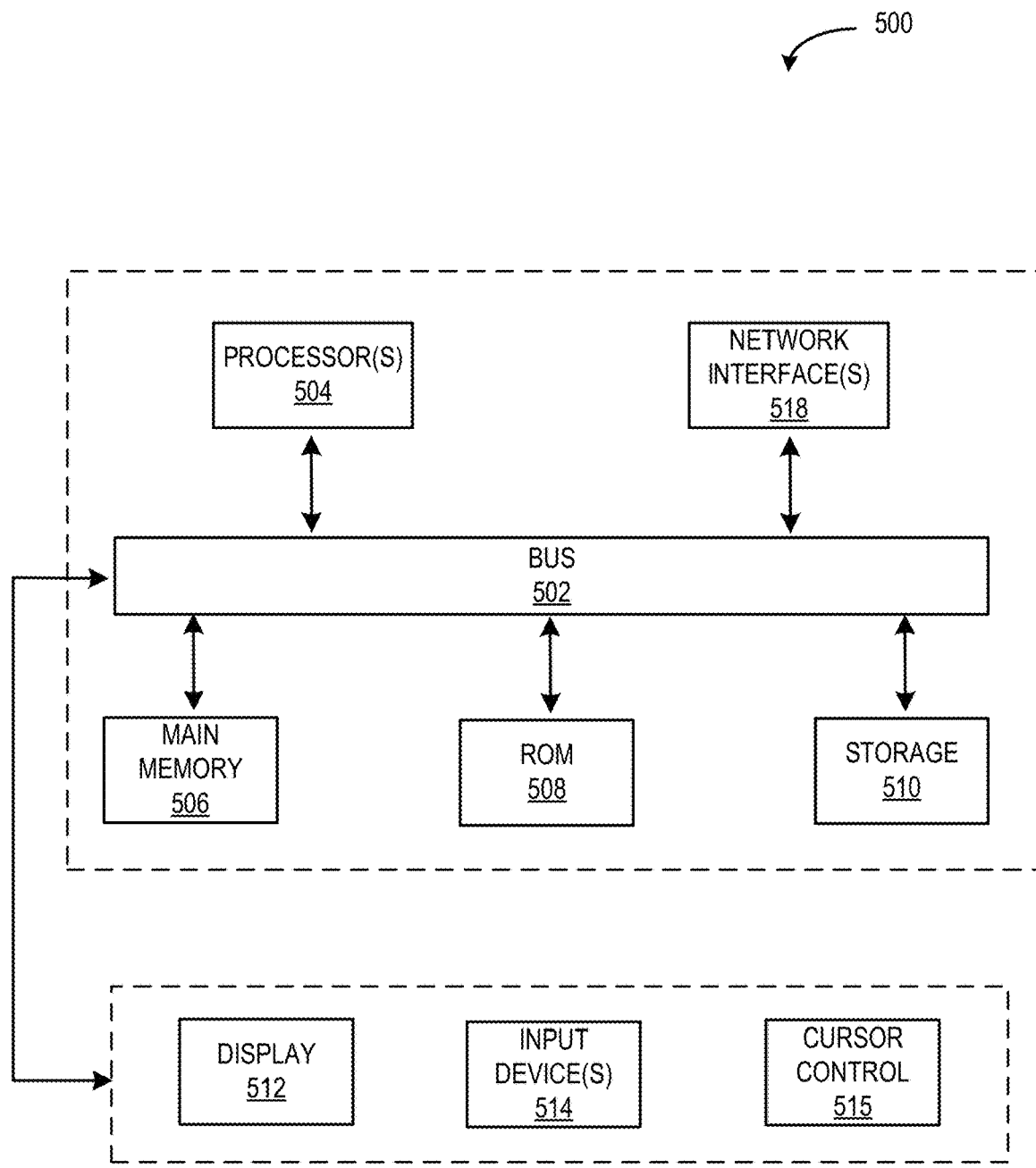
FIG. 5 is an example computing component that may be used to implement various features of embodiments described in the present disclosure.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes memory units, such as a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. Also coupled to bus 502 are a display 512 for displaying various information, data, media, etc., input device 514 for allowing a user of computer system 500 to control, manipulate, and/or interact with computer system 500. One manner of interaction may be through a cursor control 516, such as a computer mouse or similar control/navigation mechanism.

In general, the word "engine," "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
receiving identification information regarding a software-defined wide area network (SDWAN) device;
authenticating the SDWAN device;
synchronizing a SDWAN routing service with the SDWAN device based on latest state and local route prefixes associated with the SDWAN device; and
publishing new states to the SDWAN device commensurate with routes created by the SDWAN routing service based on the latest state and local route prefixes.

2. The method of claim 1, wherein the SDWAN routing service comprises a cloud branch gateway protocol (BGP) microservice implemented across a cluster of cloud BGP servers and a cluster of path computation modules (PCMs).

3. The method of claim 2, wherein a first cloud BGP server of the cluster of cloud BGP servers publishes the latest state and local route prefixes from an overlay agent of the SDWAN device to a first PCM of the cluster of PCMs.

4. The method of claim 3, wherein the overlay agent and the first cloud BGP server communicate across an overlay agent channel, the overlay agent channel being assigned in accordance with a load-balancing mechanism binding a tenant operating the SDWAN device and the cluster of BGP servers.

5. The method of claim 4, wherein the load-balancing mechanism is based on one of a hypertext transfer protocol (HTTP) header or uniform resource locator (URL) associated with the tenant.

6. The method of claim 5, further comprising inserting a custom header onto packets transmitted on the overlay agent channel based on the one of the HTTP header or URL associated with the tenant.

7. The method of claim 4, wherein the first cloud BGP server performs the publishing of the new states to the overlay agent of the SDWAN device, upon publishing of the new states by the first PCM to the first cloud BGP server.

8. The method of claim 4, further comprising establishing the overlay agent channel based on a specific virtual Internet Protocol (VIP) address associated with the SDWAN routing service such that control plane traffic of the SDWAN routing service is isolated from management plane traffic of the SDWAN routing service.

9. The method of claim 4, wherein an elastic load-balancing component of the SDWAN routing service terminates the overlay agent channel as a secure channel and establishes the overlay agent channel as a plain-text channel to the first cloud BGP server.

10. The method of claim 4, further comprising managing the load-balancing mechanism by a PCM scheduler component based on a number of active PCMs, a number of SDWAN devices associated with a tenant, a number of tunnels for the tenant, and a latest state update associated with the tenant.

11. The method of claim 10, further comprising storing a tenant-to-PCM mapping and tenant-relevant information reflected by the load-balancing mechanism in a distributed key-value store of the SDWAN routing service.

12. The method of claim 11, further comprising discovering each PCM of the cluster of PCMs via the tenant-to-PCM mapping and tenant-relevant information reflected in the distributed key-value store, each of the PCMs registering with the distributed key-value store upon operation initialization.

13. The method of claim 12, further comprising initiating, by the PCM scheduler, keep-alive and periodic health check operations directed to each PCM of the cluster of PCMs using remote procedure calls.

14. The method of claim 3, wherein the overlay agent operatively connects to an underlay routing daemon to obtain the local route prefixes.

15. A system providing a software-defined wide area network (SDWAN) overlay routing service, comprising:
a plurality of cloud branch gateway protocol (BGP) servers that together, comprise a cloud BGP microservice to:
receive information identifying a SDWAN device and authenticate the SDWAN device; and
a cluster of path computation modules (PCMs) that together, comprise a PCM microservice to:
synchronize routes associated with the SDWAN device based on latest state and local route prefixes associated with the SDWAN device; and
publish new states to the SDWAN device commensurate with routes created by the SDWAN routing service based on the latest state and local route prefixes.

16. The system of claim 15, wherein the cloud BFP microservice receives the information identifying the SDWAN device from an overlay agent implemented at the SDWAN device, the overlay agent connecting to an underlay routing daemon to obtain the local route prefixes and transmitting the information via an overlay agent channel.

17. The system of claim 16, wherein the overlay agent establishes the overlay agent channel based on a specific virtual Internet Protocol (VIP) address associated with system such that control plane traffic of the SDWAN overlay routing service is isolated from management plane traffic of the SDWAN overlay routing service.

18. The system of claim 16, wherein the cloud BGP microservice publishes the latest state and local route prefixes from the overlay agent of the SDWAN device to the PCM microservice.

19. The system of claim 16, wherein the overlay agent channel is assigned in accordance with a load-balancing mechanism binding a tenant operating the SDWAN device and the plurality of cloud BGP servers.

20. The system of claim 19, further comprising a PCM scheduler component to manage the load-balancing mechanism based on a number of active PCMs, a number of SDWAN devices associated with the tenant, a number of tunnels for the tenant, and a latest state update associated with the tenant.

* * * * *